April 16, 1940.  J. E. HOOPER  2,197,471
OIL FILTER CARTRIDGE AND CASING
Filed May 13, 1937   2 Sheets-Sheet 2

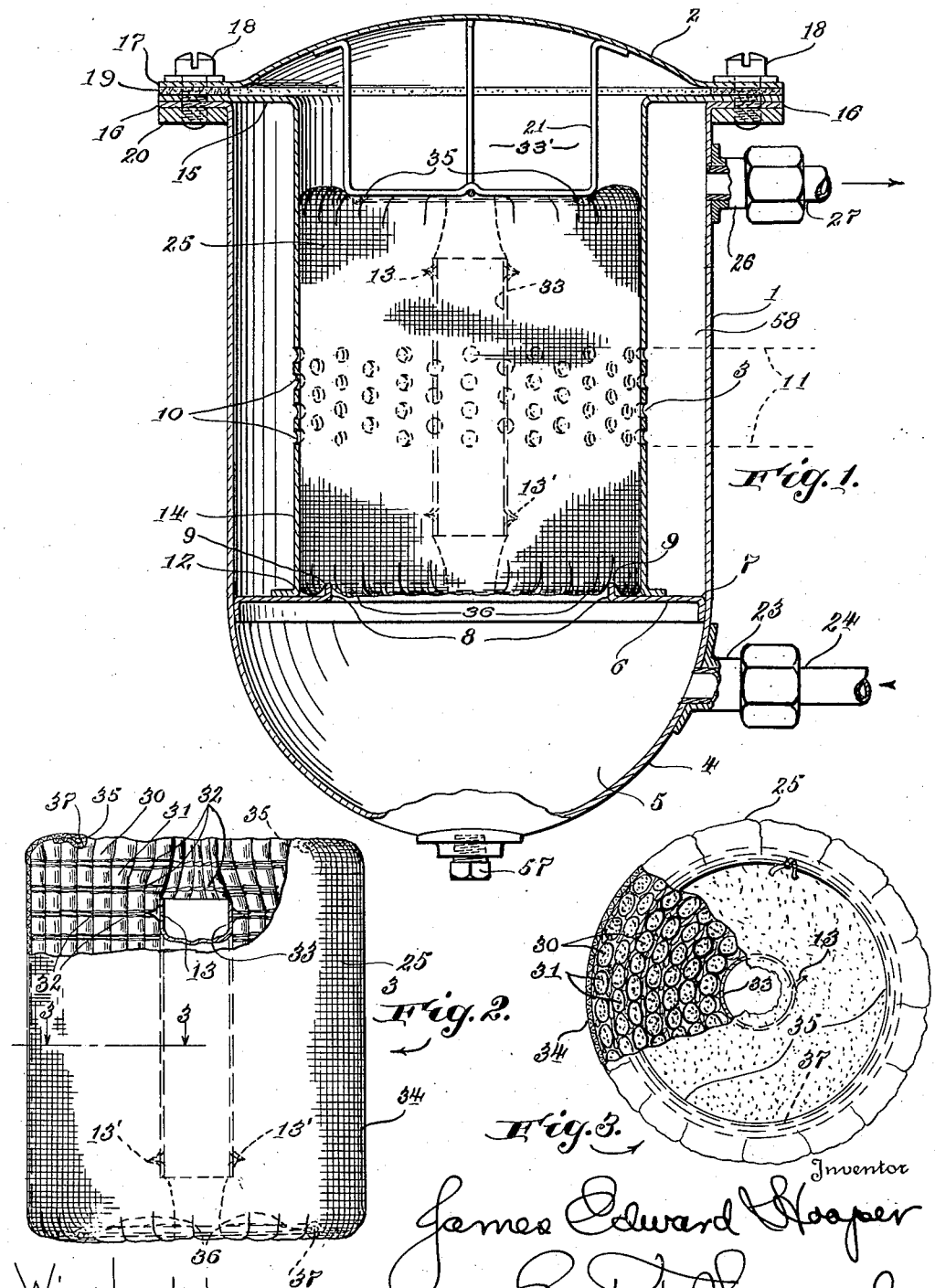

Inventor
James Edward Hooper
By Edwin F. Samuels
Attorney

Witness

Patented Apr. 16, 1940

2,197,471

UNITED STATES PATENT OFFICE 2,197,471

OIL FILTER CARTRIDGE AND CASING

James Edward Hooper, Ruxton, Md., assignor to Wm. E. Hooper & Sons Company, a corporation of Maryland Application May 13, 1937, Serial No. 142,382

6 Claims. (Cl. 210—131)

The invention relates to the filtration of oil as in the lubricating systems of internal combustion motors and other lubricating systems where relatively small quantities of oil are in continuous circulation and subject to the accumulation of foreign matter which, if not removed, interferes with lubrication, the filtering device of the invention being capable of more general application, as in the fuel line of an oil burner or an internal combustion motor.

The invention provides a new type of filter cartridge which is particularly adapted for use in a filter casing which is so arranged as to permit the removal of the used cartridge and its replacement by a new one, though the cartridge is also capable of use in the type of casing which is permanently closed and does not provide for the replacement of the cartridge.

While the cartridge is adapted to general application, being capable of installation in various known types of filter casing, the invention also provides an improved casing particularly adapted for use in combination with the first and second of the various forms of the cartridge of the invention as illustrated.

The previous development of the oil filter art includes removable and other types of filter cartridges of mineral wool, cotton and similar waste, and various types of fabric filters of cotton and other fibers. The mineral wool filters are found in use to be subject to the objection that the mineral fibers are not of a sufficient degree of flexibility and do not have the filtering property of cotton and similar fibers and, as embodied in the filter, are not so closely related as to remove the fine particles of foreign matter, so that the filtered oil does not retain in full its properties of lubrication. The filters composed of cotton and similar waste, consisting of tangled masses of thread and yarn and knots, leave pockets and passages which reduce the efficiency of the filter by providing for the free passage of the oil without uniform filtration. Also, the thread and yarn composing the waste are tightly spun so that little oil actually passes through the threads and yarns, and filtration is dependent mainly on the passage of the oil through the interstices between the yarns and/or threads.

While the woven fabric filters have a higher degree of efficiency than those composed of waste, they also tend to provide passages for the oil by way of which it escapes through the filter without sufficient treatment and separation; or, if composed of closely woven and closely combined sheets of fabric, may so obstruct the passage of the oil that a comparatively small quantity of the oil is filtered, there being a tendency to by-pass the oil without filtration, the provision of a by-pass in connection with the oil filters of internal combustion motors being generally regarded as essential in order to provide lubrication in case the filter becomes clogged. The woven and similar fabric type of filter is also of comparatively short life, being subject to quick clogging on account of the small capacity for receiving and impounding within the body of the filter the foreign matter deposited.

The present invention, which is believed to overcome to a highly satisfactory degree the difficulties of the prior art as above outlined, provides a filter cartridge, the principal filtration element of which is cotton or similar fibers, as retted flax or linen in the form of sliver, the term "sliver" for the purposes of the present description and claims being used to designate a soft, fleecy strand of cotton or similar fibers after carding and prior to spinning; roving, which is a sliver with a small number of twists per inch, being usable for this purpose to no greater degree of satisfaction than the untwisted sliver. While the sliver or roving applied in accordance with the invention may have a slight twist, the fibers are loosely associated as compared to the spun yarn or threads used in the production of woven or knitted fabrics and are substantially or relatively straight extending in the direction of the length of the strand, the material being preferably taken from the carding machine.

The sliver used in the practice of the invention in its present state of development is prepared by the regular process of preparing cotton fiber for spinning, except that the sliver may, if desired, be supported by a strand of yarn embodied therein and extending in the direction of the length of the sliver. The sliver at present employed in the preferred practice of the invention is, when bound by stitching or otherwise confined for the purpose of the invention, about one-third of an inch in diameter. This size, however, is incident to conformance to cotton mill practice in preparation of the sliver, the texture rather than the size of the strands being important. When unconfined, the roving is inclined to expand to the appearance of cotton batting as it is called in non-technical terms; and it is noted that the fibers, while in the majority they extend in the same general direction, are not, strictly speaking, parallel. Unless reinforced, as by a longitudinal yarn, the sliver is of slight tensile strength. By twisting, its strength is greatly increased, but this likewise decreases its permeability by oil and its ability to take up foreign particles. The term "parallel" as applied to the fibers is used as above.

This roving or sliver, while of substantially uniform density, permits penetration of the oil with substantial freedom throughout the area of the roving and, the fibers being laid with substantial uniformity, there are no passageways or pockets through which the oil can pass without filtration, the filtration effect being substantially uniform throughout the volume of the material. A further advantage of the sliver or roving is that it is much cheaper than fabric, the spinning and weaving operations being omitted, and it has a much greater filtering capacity per pound and per unit of volume which it occupies in the filter cartridge and casing than either fabric or waste.

To avoid partial disintegration and escape of any fibers which might become separated, the filter cartridge may be enclosed in an oil-permeable fabric cover or bag or may be formed of alternate layers of fabric and sliver, the term "sliver" being used to indicate a strand of cotton or equivalent fiber after carding or similar treatment to lay the fibers together in substantial parallelism and prior to spinning whereby the fibers are formed into yarn or threads. While a degree of twisting as performed in the roving machine may be present, it is not regarded as helpful.

In the accompanying drawings, I have illustrated a filter cartridge in which the principal filtering element consists of sliver in accordance with the above definition, and a casing particularly adapted for use in connection with such a cartridge, the cartridge being adapted for use with other types of casing and the drawings being illustrative of the preferred application of the invention capable of a considerable degree of variation.

In the drawings:

Figure 1 is a cross section on the vertical axis of the filter, showing the filter cartridge and casing.

Figure 2 is a corresponding section of a filter cartridge embodying the invention.

Figure 3 is a section on the line 3—3 in Figure 2.

Referring to the drawings by numerals, each of which is used to indicate the same or similar parts in the different figures:

Figure 4:
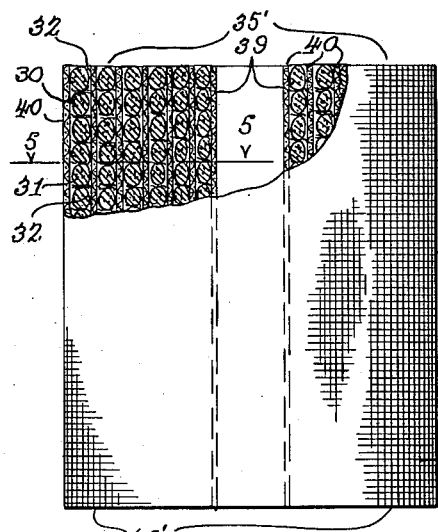
Figure 4 is a section corresponding to Figure 2 showing a modified form of cartridge.

The filter casing shown in Figure 1, which is preferably of circular cross section, comprises an outer casing 1, a removable cover 2, and an inner casing 3, it being understood that the casing is capable of wide variation, the use of the cartridge not being limited to this type of casing.

The outer casing 1, as shown, is formed with a bowl-shaped bottom portion 4 providing a settling chamber 5, though the exact shape of this bottom portion is not essential. The settling chamber 5 has a top wall 6 shown as of an annular shape, the outer peripheral edge of the wall 6, at 7 being secured to the outer wall of the casing 1 in any suitable manner, as by flanging and welding, brazing, or the like. The wall 6 in the construction shown is formed with a central opening 8 which may be surrounded by an upwardly-turned flange 9 which is adapted to indent the cartridge, eliminating any possibility of by-passing the oil and thus reducing the filtration effect of the cartridge.

The inner casing 3 which is adapted to fit the cartridge or vice-versa, the cartridge in practice being formed to fit the casing, is perforated at 10 as to its entire central zone, the upper and lower limits of which are indicated by dotted lines 11. The bottom edge 12 of the side walls 14 of the inner casing are formed integral with or secured by brazing, welding, or the like to the wall or partition 6, and the upper portions of these side walls 14 are flanged or turned outwardly at 15, being attached to the outer casing 1 in any suitable manner. This flange may, if desired, overlie and be welded or otherwise secured to the top flange 16 of the outer casing 1 which is formed to receive the flange 17 of the cover 2. This arrangement provides a peripheral discharge chamber 58 to be further described.

The cover is secured in any suitable manner to give an oil-tight joint, the screws 18 being regarded as satisfactory for this purpose. A suitable gasket 19 may be also provided to complete the oil-tight joint and the under side of the casing flange may be suitably bossed or provided with nuts 20 in which the screws 18 are seated.

The filter cartridge 25 which, as aforesaid, is formed to fit closely within the inner casing 3, is forced downwardly against the bottom flange 9 of the inner casing 3 by means of a thrust frame or thrust member 21 which extends downwardly from the cover and may be of upright U shape, preferably consisting of two or more U shaped members having the cross arms of the U radially arranged and intersecting, the exact form of the thrust member or the manner of holding the cartridge in place being non-essential.

The outer casing 1 is provided with an inlet pipe fitting 23 in the wall of the settling chamber 5, adapted to be connected to the inlet pipe 24, and the casing is provided just beneath the top flange 16 with an outlet fitting 26 leading from the annular discharge chamber 58 and adapted to be connected to the oil discharge pipe 27.

The oil filter casing described is particularly adapted for use in connection with the lubrication system of an internal combustion motor, which may be of the type used in motor vehicles. The cartridge to be described may be used in this or in other types of filter casing.

Figure 8:
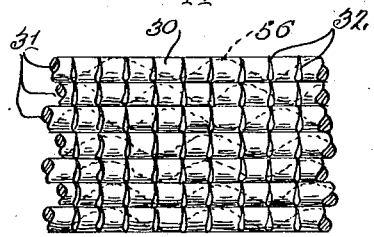
Figure 8 shows a fragment of sliver sheet.

Referring to Figures 2 and 3, the cartridge shown, indicated by reference character 25, is formed of a roll of sheet material 30 which consists of parallel strands 31 of sliver laid side by side and knitted or stitched transversely to the strands as best shown at 32 in Figure 8.

In Figure 2 this sheet material is wrapped about a core 33 which, as shown, is tubular, though the tubular core is not essential to the filter cartridge of the invention in all of its various forms. The tubular feature, however, is regarded as of advantage in connection with the type of casing above described in order that filtration may be performed at both ends of the cartridge as hereinafter described. The cartridge may, however, be used in connection with other methods of filtration with other types of core; and an important feature of the invention, namely the use of cotton sliver as the body of the cartridge, is entirely independent of the core.

In the form shown in Figures 2 and 3 the strands 31 of sliver are parallel to the axis of the filter, the sheet material being wrapped about the core 33 so that the lines of stitching 32 extend circumferentially about the cartridge. The core 33, as shown, is perforated at 13 and may have the punched out portion 13' formed into prongs to hold the sliver for winding about the core.

To prevent disintegration of the roving and escape of the fibers, the cartridge 25 (Figure 2) may be enclosed in a fabric bag 34 and this fabric bag is shown as having a relatively large opening at the top at 35 and at the bottom at 36, the openings being preferably closed by draw-strings 37. This construction of the bag is particularly adapted to the filter casing (Figure 1) which, as hereinafter described, provides for the entrance of the unfiltered oil into the cartridge at both the top and bottom. When the cartridge is otherwise applied, these openings may be differently arranged to suit a different type of casing.

The object in providing the large openings for the entrance of the oil to be filtered is to avoid clogging of the bag fabric with the foreign matter removed from the oil and consequent loss of the capacity of the filter. With the arrangement shown, the foreign material not deposited in the settling chamber 5 of the casing is held not only on the surface but to a large extent within the body of sliver composing the cartridge, indefinitely increasing the ability of the cartridge to separate and retain the foreign material from the oil without clogging. In actual use, this is found to be true, and the sliver or roving type of cartridge is also found to remove the finest particles, maintaining the purity and even the color of the oil for a long period of use.

Figure 5:
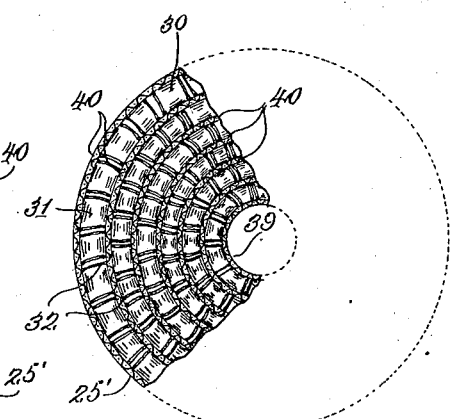
Figure 5 is a section on the line 5—5 in Figure 4.

Figures 4 and 5 show a slightly modified form of the cartridge 25 in which the sliver or roving sheet 30 is wrapped about the core so that the sliver or similar strands 31 extend circumferentially about the cartridge and about an axial opening 39, the material being supported around the opening in any suitable manner, as by a core or mandrel which may be withdrawn. The lines of attachment in the form of knitting or stitching or other means for holding the strands indicated by reference character 32 are, in this instance, vertically arranged. In this construction, the roving sheet is combined with woven fabric 40, a sheet of woven or similar fabric being laid in registration with the silver sheet and wound in cylindrical arrangement to form the cartridge. The cartridge for use in the manner to be described in connection with the casing (Figure 1) may have the sliver completely uncovered at the ends at 35' and 36', the contaminated oil entering at both ends and the filtered oil being discharged at the sides through the openings 10 in the casing as described. There is no tendency for the fibers to escape, as these openings are covered by the outer layer of fabric 40.

Figure 6:
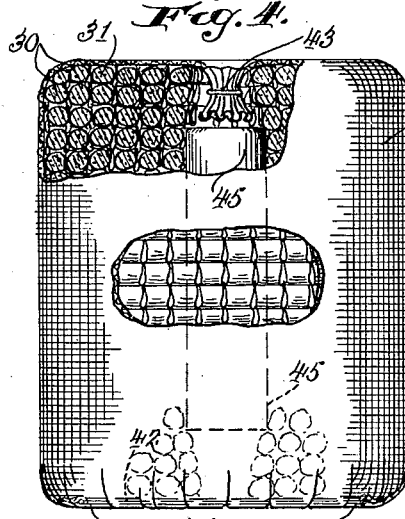
Figure 6 is an elevation of a cartridge having the sliver strands extending circumferentially but with the layers of woven fabric omitted in favor of a bag enclosing the cartridge, the same being broken away to show the sliver, the view also including a fragmentary section showing a closed core.

Figure 6 shows a filter cartridge of the type in which the sliver strands 31 extend circumferentially, the body of the cartridge being enclosed in a fabric bag 34' having an opening 41 at the bottom confined by a draw-string 42, the edges of the opening in the bag at the top being gathered at 43 and tied on the inside by means of a binding member 44. This type of filter cartridge is shown as having a solid core which appears in dotted lines at 45.

Figure 7:
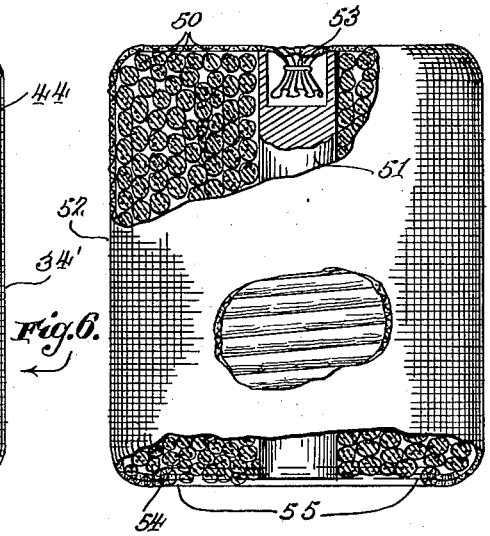
Figure 7 is a section like Figure 2 of still another form of cartridge.

Figure 7 shows fragmentarily still another type of filter cartridge in which the sliver 50 or roving, instead of being combined in sheets of parallel strands connected by transverse lines of knitting, stitching, or the like, is wound in the form of a soft strand of sliver or roving directly on a core 51 and enclosed within a bag 52 which may be tied at the top at 53 and provided with a drawstring 54 at the bottom surrounding opening 55, which is preferably sufficient to admit the oil to the filter, or it may be restricted as desired. This construction may, if desired, be adapted to the type of casing (Fig. 7) or to the various known types of oil filter casing, as in assignee's previous application by Harry B. Beck, No. 129,186.

Figure 8 shows a fragment of sliver or roving sheet 30 consisting of soft fleecy strands 31 connected by transverse lines of attachment 32 produced by knitting or stitching with yarn or thread, the use of a knitting machine for this purpose being in accordance with applicant's present preferred practice. The strands used in this preferred practice consist of cotton fiber as it comes from the carding machine or the drawing frame, but the presence of a slight twist resulting from treatment in a roving machine, though regarded as unnecessary, does not render the material wholly unfit for this purpose. To prevent breaking of the sliver strands in the process of manufacture, applicant may embody one or more strands of cotton yarn 56 in each strand of sliver, preferably winding the yarn in a steep helix about the sliver. To distinguish the sliver from wadded cotton and waste, the fibers have been referred to as substantially parallel, this being the effect of carding. While cotton is most easily available and satisfactory, linen and similar cellulose fibers are usable.

In operation, referring particularly to Figure 1, it will be understood that the cartridge 25 in the various forms shown is adapted by slight change for use in different types of filter casing. To insert the cartridge 25 within the casing 3, it is slightly compressed, the sliver of which the cartridge is composed being highly resilient, so that the cartridge fills the inner casing leaving no opportunity for the oil to pass along the walls of this casing. The cover 2, having been removed for the admission of the cartridge, is then replaced and secured, the thrust member 21 serving to hold the cartridge in close contact with the bottom flange 9 and particularly the edges 8 thereof which it is desirable to have up-turned to indent the cartridge and make extremely close contact.

The cartridge being suitably installed, the operation in connection with the particular type of casing shown provides for the admission of oil to the filter by way of the tube or pipe 24, under which circumstances the heavier particles of foreign matter, or a considerable portion of them, may be retained in the settling chamber 5 to be removed if desired by way of the drain plug opening at 57.

In the filtering operation in connection with the type of casing shown, a portion of the oil (approximately half of it) passes upwardly through the soft fleecy sliver by which the impurities, including the fine and coarse dirt and coloring matter, are separated from the oil. The filtered oil passes outwardly through the perforations 10 into the annular compartment 58 which surrounds the inner casing and the remainder of the oil, which may be approximately the other half of the oil, passes upward through the hollow core 33 to the transfer chamber 33' and hence downwardly through the body of the sliver forming the filter cartridge 25, being passed through the perforations 10 into the annular chamber 58 from which all of the oil thus filtered passes back into the circulating system by way of the tube or passage 27. Some of the oil may enter the cartridge through perforations 13.

By this double action of the cartridge, filtration taking place from both ends toward the center, a relatively large capacity is obtained and, with the use of the sliver type of filtering material, the result gives uniform and satisfactory filtration with a relatively long life of the filter cartridge due to the capacity of this material to retain between the spaced cotton fibers a very large proportion of impurities before the cartridge becomes finally saturated and clogged so as to require replacement. It is of importance that with this type of material the fibers are uniformly laid and uniformly placed in substantial parallelism so that there are no pockets or passages for the passage of unfiltered oil and no knots or relatively compact portions as in the filters composed of cotton waste and woven fabrics of relatively hard yarn which have comparatively little filtration capacity.

While applicant's filter, except in the form Figure 7, includes lines of stitching which hold the strands of roving in position, and also includes a woven fabric covering or fabric partitions, these form a comparatively small proportion of the body of the filter, and the woven fabric serves preventing the escape of the lint which is an incident to all filter cartridges of textile fiber in the absence of a suitable strainer adapted to prevent this result. While a sliver of cellulose fibers is the preferred filling agent, the inclusion of other fibers would not be regarded as a departure from the principles of the invention.

The sliver type of cartridge has the important advantage not only of large capacity and relative cheapness but the further advantage that the fibers thus uniformly laid and uniformly spaced are thoroughly permeable by the oil and the separation of foreign material obtained is most satisfactory, the oil retaining its purity and even its color for a long period due to the large capacity of the sliver to separate and hold foreign matter within the sliver.

The filter cartridge 25' (Figures 4 and 5), having layers of fabric 40 between the layers of sheet roving 30, is particularly well adapted to the type of filter casing shown in Figure 1, the roving being exposed at both ends for the entrance of the oil, part of which passes upwardly through the hollow 39, the oil being passed alternately through the roving and through the fabric, and the oil which enters at both ends 35' and 36' being finally discharged into the annular chamber 58 by way of the perforations at 10. The opening 39 may be without a supporting core, the aperture remaining open sufficiently to pass oil under pressure so that satisfactory filtration takes place from both ends as explained. The walls of the opening 39 afford additional surface for the entrance of oil into the cartridge.

The type of filter cartridge shown in Figure 6, provided with a solid core 45, is adapted for use in the casing (Figure 1) but is better adapted to the filter casings of the prior art in which the oil is passed directly through the entire length of the cartridge. When the cartridge of Figure 6 or that of Figure 7 is installed in the filter casing of Figure 1, the oil enters the cartridge from the bottom and passes out through the perforations 10 into the annular space 58 from which it enters the discharge pipe 27. Used in this way, the main body of the cartridge is utilized, becoming completely saturated. These cartridges are, however, more suitable to the type of casing shown in assignee's co-pending application #129,186 in which the oil passes through the entire length of the cartridge, being discharged at the top or opposite end.

The duplex operation described in connection with the cartridges 25 and 25', when used with the type of casing in Figure 1, provides, in connection with the sliver type of filter cartridge, complete filtration of the oil with excess capacity as to the oil passed through the filter in any given time and a relatively long life of the filter cartridge on account of the large surface exposed for the entrance of the contaminated oil and particularly on account of the ability of this material to take up and retain large quantities of the foreign matter to be separated from the oil. Without regard to the type of casing, it is considered as of particular importance that, while the fibers are widely separated as compared to the arrangement of fibers in the form of yarn embodied in woven and knitted fabrics and in the form of waste which is yarn thread and knots in irregular arrangement, these fibers are so uniformly arranged and closely related as compared to the separate yarns in the filtration fabrics and waste previously employed, that this material affords a relatively free passage for the oil and at the same time uniform and complete filtration beyond that obtained with the other materials, due to the uniform spacing of the fibers. The material is also cheaper for this purpose than fabric or waste, as the weight required for a filter of given capacity is less.

I have thus described a filter cartridge in connection with a filter casing adapted for use with this type of cartridge, though the use of the cartridge is in no wise limited to this type of casing, the description being specific and in detail in order that the embodiment of the invention shown and the manner of constructing, applying, operating and using the same may be clearly understood; however, the specific terms herein are used descriptively rather than in a limiting sense, the scope of the invention being defined in the claims.

What I claim as new and desire to secure by Letters Patent is:

1. An oil filter cartridge consisting of fleecy strands of sliver comprising cotton fibers laid in the direction of the length of the strands, the sliver being wound in a plurality of layers about an axis, forming a body of considerable thickness and a strainer to retain the fibers, the said cartridge being adapted for insertion in a filter casing and to thus serve as the filtering element in the oil line of an internal combustion motor or the like.

2. An oil filter cartridge adapted for use in a filter casing to be inserted in the lubricating system of an internal combustion motor, the same consisting of fleecy, substantially unspun carded strands laid side by side in sheet form and transverse threads connecting the strands to hold them together, the sheet material being wound in substantially cylindrical layers about the central axis of the filter cartridge.

3. A filter for the lubricating systems of internal combustion motors and the like comprising an outer casing, an inner casing of substantially cylindrical form having passages leading outwardly from its central zone, an annular discharge chamber to which the inner casing is connected by said passages, an inlet chamber having an opening into said inner casing at one end of the same, a cartridge fitting in said inner casing and having a central passage smaller than said opening and leading from said opening through the cartridge, the casing having a transfer chamber at the other end of said inner casing which is open to the end of the cartridge, said latter opening surrounding the corresponding end of said central passage, whereby a part of the oil goes from the inlet chamber through said central passage in the cartridge and enters the cartridge from the transfer chamber, the remainder of the oil entering the cartridge from the inlet chamber and the filtered oil being discharged through the passages from the inner chamber to the annular chamber and hence from the filter.

4. An oil filter cartridge for use in a filter casing adapted for insertion in the lubricating system of an internal combustion motor or the like, the said cartridge comprising a substantially cylindrical body of considerable radial thickness and also of considerable axial dimension and composed substantially in entirety of soft, fleecy, strands of sliver of cotton fibers, the strands being closely arranged with substantial uniformity and closely combined to form the body of the cartridge, the fibers comprising the main filtering agent of the cartridge.

5. The combination with a filter cartridge, the filtering element of which comprises soft, fleecy strands of cellulose fibers laid in the direction of the length of the strands, the strands being closely related to each other to provide for filtration of the oil through the strands, the cartridge having a central tubular core passage, of a filter casing having an inner casing for the cartridge open at its ends around the ends of said core passage, means for supplying oil to one end of said cartridge and through said tubular core to the other end of the cartridge, said inner casing having a discharge passage intermediate of its ends and intermediate of the ends of said cartridge, whereby the oil to be filtered is passed into the cartridge at the respective ends of the same and discharged intermediately of said ends.

6. The combination of a filter cartridge having a central tubular passage, of a filter casing having an inner casing for the cartridge open at its ends around the ends of said core passage, means of supplying oil to one end of said cartridge and through said tubular core to the other end of the cartridge, said inner casing having a discharge passage intermediate of its ends and intermediate of the ends of said cartridge, whereby the oil to be filtered is passed into the cartridge at the respective ends of the same and discharged intermediately of said ends.

JAMES EDWARD HOOPER.